(12) United States Patent
Schaft

(10) Patent No.: US 11,091,184 B2
(45) Date of Patent: Aug. 17, 2021

(54) TIRE ASSEMBLY SERVICE CART

(71) Applicant: Lyft, Inc., San Francisco, CA (US)

(72) Inventor: Frederick J. Schaft, Abington, PA (US)

(73) Assignee: LYFT, INC., San Francisco, CA (US)

( * ) Notice: Subject to any disclaimer, the term of this patent is extended or adjusted under 35 U.S.C. 154(b) by 0 days.

(21) Appl. No.: 16/539,791

(22) Filed: Aug. 13, 2019

(65) Prior Publication Data
US 2021/0046965 A1  Feb. 18, 2021

(51) Int. Cl.
*B62B 3/10* (2006.01)
*B62B 3/02* (2006.01)
*B62B 3/14* (2006.01)
*B62B 3/04* (2006.01)

(52) U.S. Cl.
CPC ................ *B62B 3/104* (2013.01); *B62B 3/02* (2013.01); *B62B 3/04* (2013.01); *B62B 3/1472* (2013.01); *B62B 2202/031* (2013.01)

(58) Field of Classification Search
CPC ....... B62B 2202/031; B62B 3/02; B62B 3/04; B62B 3/1472; B62B 3/104
See application file for complete search history.

(56) References Cited

U.S. PATENT DOCUMENTS

| | | | | |
|---|---|---|---|---|
| 2,543,276 | A * | 2/1951 | Buechler | B60B 29/002 414/428 |
| 4,872,694 | A * | 10/1989 | Griesinger | B60B 29/002 280/79.4 |
| 10,226,964 | B2 * | 3/2019 | Rucchetto | B60B 29/001 |
| 10,479,140 | B2 * | 11/2019 | Lindgren | B62B 3/0606 |
| 10,752,052 | B2 * | 8/2020 | Sauer | B60B 30/10 |
| 2005/0254923 | A1 * | 11/2005 | Gorski | B66F 9/148 414/426 |
| 2006/0151248 | A1 * | 7/2006 | Rodriguez | B62B 5/0438 187/222 |
| 2006/0181057 | A1 * | 8/2006 | Kollarits | B60B 29/002 280/475 |

* cited by examiner

*Primary Examiner* — Kaitlin S Joerger
(74) *Attorney, Agent, or Firm* — Keller Jolley Preece

(57) ABSTRACT

Systems for inspecting and servicing a tire assembly are provided. In one embodiment, a tire assembly service cart is provided that includes a tire assembly support structure. The tire assembly support structure may include a side support member that is positioned to support a side of the tire assembly. The tire assembly support structure may also include a first bottom support member positioned to support a bottom portion of the tire assembly. The side support member may include a first roller and the first bottom support member may include a second roller. Further, the first and second rollers may be positioned to allow the tire assembly to rotate around a rotation axis while supported by the tire assembly support structure.

20 Claims, 13 Drawing Sheets

TIRE ASSEMBLY SERVICE CART

BACKGROUND

Typical vehicle maintenance visits at a vehicle service center require a service technician to perform discrete and repeatable maintenance tasks on a vehicle, or set of vehicles. For example, typical vehicle maintenance may frequently require a service technician to perform an oil change, check fluid levels, inspect or replace filters, inspect and repair tires, etc. In some instances, the performance of such maintenance tasks may be subject to inefficiencies that not only cause service time delays, but also pose injury risks to service technicians performing the maintenance tasks. Because the maintenance tasks are performed frequently and potentially on multiple vehicles, the service time delays can cause significant throughput delays within a service facility. Similarly, even minor increases in injury risks during the performance of such maintenance tasks can create significant injury risk for service facility staff overall.

SUMMARY

The present disclosure presents new and innovative systems for servicing tire assemblies. In one aspect, a tire assembly service cart is provided comprising at least one tire assembly support structure. The tire assembly support structure may include a side support member positioned to support a side portion of a tire assembly positioned on the tire assembly support structure. The tire assembly support structure may also include a first bottom support member positioned to support a bottom portion of the tire assembly. The side support member may include a first roller and the bottom support member may include a second roller. The first roller and the second roller may be positioned to allow the tire assembly to rotate around a rotation axis of the tire assembly service cart while supported by the tire assembly support structure.

In a second aspect according to the first aspect, the first roller and the second roller are positioned substantially perpendicular to each other.

In a third aspect according to either the first or second aspects, the rotation axis is substantially perpendicular to the side support member.

In a fourth aspect according to any of the first through third aspects, the side support structure includes a second bottom support member that is different from the first bottom support member. The second bottom support member may include a third roller and may be substantially parallel to the first bottom support member.

In a fifth aspect according to the fourth aspect, the first bottom support member and the second bottom support member are connected to the side support member.

In a sixth aspect according to the fourth or fifth aspect, the first bottom support member may be coupled to the side support member by at least a first structural member that connects to a protruding end or an interior end of the first bottom support member. The second bottom support member may also be coupled to the side support member by at least a second structural member that connects to a protruding end or an interior end of the second bottom support member.

In a seventh aspect according to any of the fourth through sixth aspects, the first bottom support member and the second bottom support member are positioned between 15 and 25 inches apart.

In an eighth aspect according to any of the fourth through seventh aspects, the first bottom support member and the second bottom support member are positioned between 36 and 54 inches from a bottom of the tire assembly service cart.

In a ninth aspect according to any of the previous aspects, the side support member further includes a fourth roller. The fourth roller may be positioned either above or below the first roller.

In a tenth aspect according to the ninth aspect, the first roller and the fourth roller are spaced apart along the side support member to support tire assembly assemblies ranging from 20 to 35 inches in diameter.

In an eleventh aspect according to any of the previous aspects, the first roller and the second rollers are conveyor rollers.

In a twelfth aspect according to any of the previous aspects, the side support member is tilted from vertical with a lean angle.

In a thirteenth aspect according to the twelfth aspect, the lean angle is greater than or equal to 5 degrees and less than or equal to 20 degrees.

In a fourteenth aspect according to any of the previous aspects, a height of the first bottom support member from a bottom of the tire assembly service cart is adjustable.

In a fifteenth aspect according to any of the previous aspects, the tire assembly service cart comprises two tire assembly support structures symmetrically positioned on opposite sides of the tire assembly service cart.

In a sixteenth aspect according to the fifteenth aspect, the two tire assembly support structures are connected by at least one upper member and at least one lower member.

In a seventeenth aspect according to any of the previous aspects, the tire assembly service cart further includes a plurality of vertical lifts positioned to stabilize the tire assembly service cart during servicing of the tire assembly.

In an eighteenth aspect, a tire assembly support structure is provided. The tire assembly support structure includes a side support member positioned to support a side of a tire assembly positioned on the tire assembly support structure and at least two bottom support members positioned to support the tire assembly from the bottom. The side support member and the at least two bottom support members may include rollers that allow the tire assembly to rotate around a rotation axis of the tire assembly service cart. The rotation axis may be substantially perpendicular to the side support member.

In a nineteenth aspect according to the eighteenth aspect, the side support member is tilted from vertical at a lean angle that is greater than or equal to 5 degrees and less than or equal to 20 degrees.

In a twentieth aspect, a tire assembly service cart is provided comprising two tire assembly support structures. Each tire assembly support structure may include a side support member positioned to support a side of a tire assembly positioned on the tire assembly support structure and at least two bottom support members positioned to support the tire assembly from the bottom. The side support member may include a side roller and each of the at least two bottom support members may have a bottom roller. The side roller and the bottom rollers are positioned to allow the tire assembly to rotate around a rotation axis of the tire assembly support structure while supported by the tire assembly support structure. The tire assembly service cart may also include an upper member coupled to upper ends of the two tire assembly support structures. A lower member of the tire assembly service cart may also be coupled to lower ends of the two tire assembly support structures.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
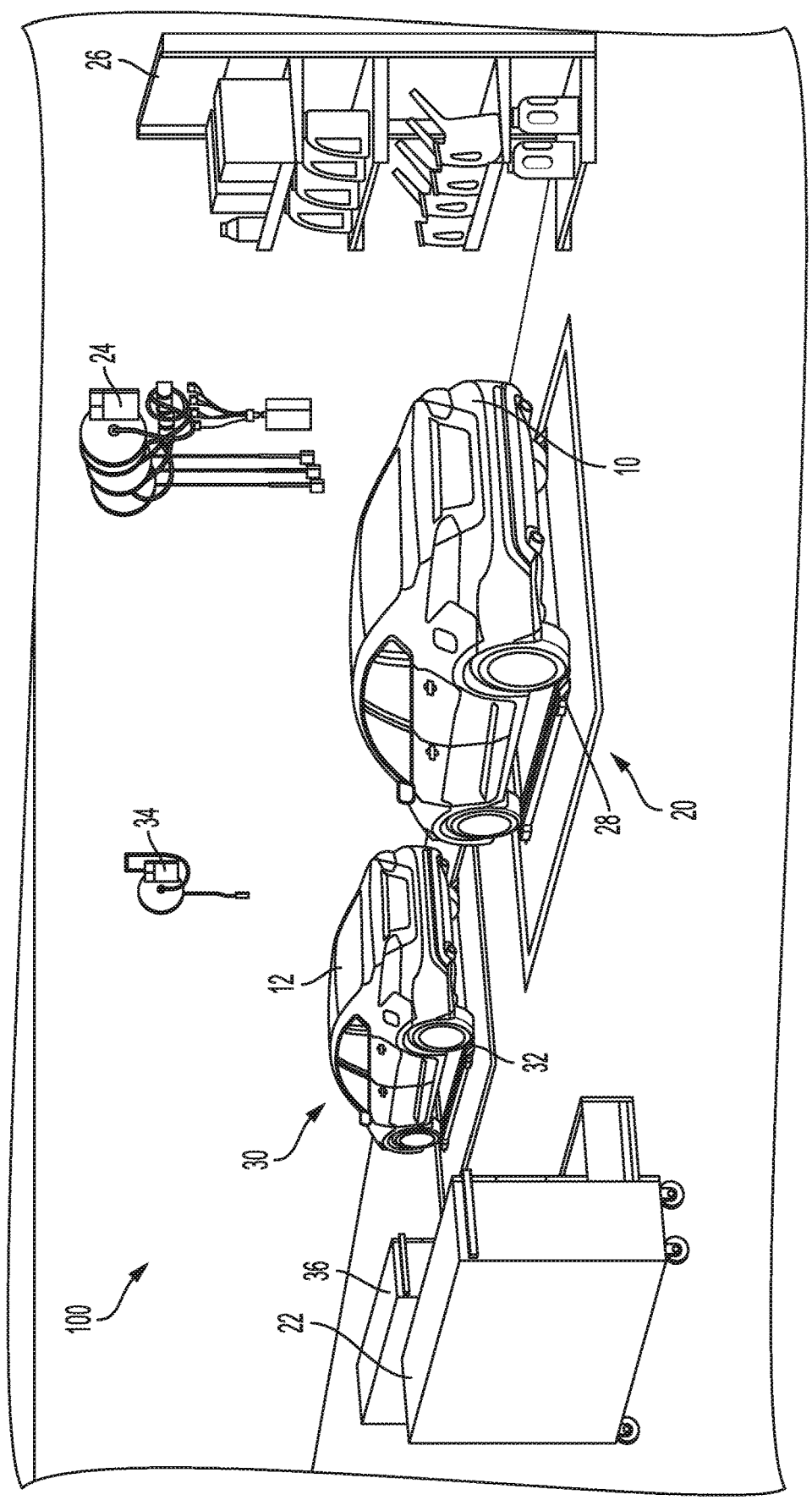
FIG. 1 illustrates a service facility according to the present disclosure.

Service facility efficiency may be essential to keep pace with changes in vehicle technology. For example, as vehicle technology advances and becomes more sophisticated, transportation providers may be unaware of how their vehicles actually function and, as a result, transportation providers may be unable to provide specific information to a service technician with respect to any particular problems their vehicle is having when the driver brings the vehicle to the service facility for service and/or maintenance. Thus, service technicians may perform multiple maintenance tasks on a vehicle, in an attempt to rule out certain causes of the problem and/or to detect problems that the driver may not have noticed. Performing multiple maintenance tasks on a vehicle in an attempt to resolve current maintenance problems and prevent potential maintenance problems is a strategy often used by organizations that rely on fleets of cars for operation. For example, transportation network companies (TNCs) rely on fleets of cars to service, for example rideshare requests. Vehicles associated with the TNC may be brought in for servicing without any preliminary technical understanding of the maintenance issues the vehicle is experiencing. Thus, a TNC may systematically perform multiple maintenance tasks on the vehicle in an attempt to identify maintenance issues. While the car is serviced by the TNC, the vehicle is unable to service rideshare requests in the transportation network.

Accordingly, any reduction in time spent servicing TNC vehicles may result in additional time spent providing rides by the transportation providers and additional fleet capacity for the TNC. Furthermore, reductions in service times at a service facility may increase the frequency with which vehicle operators (e.g., transportation providers) bring a vehicle to a service facility for servicing (e.g., a driver may be incentivized to service the vehicle because it will not take an extreme amount of time to do so), allowing for continuous maintenance to be performed on the vehicle. Performing continuous and rapid maintenance tasks on the vehicle may thereby increase long-term vehicle reliability and service time over the lifetime of vehicles because more significant vehicle problems may be avoided.

These problems may be even more evident for fleets of autonomous vehicles (AVs). For example, as more rideshare requests are serviced by AVs, TNCs may cultivate AV fleets. Because AVs do not have transportation providers, there is no person who can provide feedback on the current operation of the vehicle outside of the information available from vehicle's pre-installed sensors. Therefore, maintenance personnel may have to perform an even more rigorous set of maintenance tasks while servicing AVs to identify problems and to determine the causes of identified problems.

For example, in a typical vehicle service scenario, service personnel may discuss problems associated with the vehicle being serviced to identify any known problems that the service personnel should address in addition to the standard maintenance servicing. For example, a driver may bring their car in for an oil change but may explain to a service technician that one of the tire assemblies vibrates at high speeds. In response, service personnel may inspect the tire assembly in addition to servicing the vehicle (e.g., performing the oil change). If a problem is identified, the service personnel may formulate a repair to resolve the issue, which may require waiting for replacement parts for the tire assembly. Once the tire assembly is repaired, the service technician may test drive the vehicle to verify the repair and, upon completion of the servicing, the driver may pick up their vehicle.

For AVs, since there is no driver to identify additional issues with the vehicle, the service personnel may have to perform additional maintenance tasks on a regular basis to identify potential maintenance problems and to prevent future problems. For example, rather than relying on a driver to identify that a tire assembly is vibrating at high speeds before inspecting a tire assembly, AV service personnel may routinely perform the tire assembly inspection. In particular, especially for TNC fleets, AV service personnel may inspect the vehicle's tire assemblies during regular maintenance visits, in addition to performing other maintenance tasks.

Vehicle fleet operators such as TNCs may also incorporate additional maintenance tasks for preventative purposes, even for vehicles that are not autonomous. For example, if the tire assemblies are inspected at each maintenance visit, potential problems with the tire assemblies may be detected and repaired before becoming more serious maintenance issues. Such preventative maintenance may increase vehicle uptime for the TNCs and may allow transportation providers to continue operating their vehicles more often and/or for longer periods of time.

There exists a need, therefore, to expedite maintenance tasks, as such tasks are and will continue to be performed more frequently in vehicle fleet and AV settings. Furthermore, as the size of vehicle fleets grows, there is greater pressure on service facilities to process a greater number of vehicles in the same amount of time, which increases the need to perform maintenance tasks (e.g., preventative and/or standard maintenance tasks) as quickly as possible.

Tire servicing in particular represents a specific type of maintenance task in which inefficiencies and unnecessary injury risks exist. In particular, in a typical tire servicing scenario, a service technician removes a tire assembly (e.g., a tire and associated wheel and hub components on which the tire is applied) from a vehicle located in a service facility and inspect the tire assembly on the ground, requiring the service technician to bend over the tire assembly and physically and manually manipulate the tire assembly to initiate inspection. If a problem is identified on the tire (e.g., punctures, imperfections, or bubbles in the tire or the surface of the tire), the service technician must roll or carry the tire over to a tire servicing station within the service facility to perform the needed servicing (e.g., patching the tire, replacing the tire). Because tire servicing is frequently performed in a service facility, any decrease in the amount of time required to perform tire maintenance may drastically improve a service facility's ability to service more vehicles and overall performance.

One solution to the problem described above is to divide the maintenance tasks into subgroups that can be performed in different stations. For example, FIG. 1 depicts a service facility 100 including service stations 20, 30 serving separate vehicles 10, 12. Each service station 20, 30 may correspond to the performance of different maintenance tasks. For example, service station 20 may correspond to performing maintenance tasks related to the fluids (e.g., changing the oil, checking transmission fluid). Service station 30 may correspond to performing inspections and repairs of tire assemblies. As servicing is complete at one station 20, 30, the vehicles 10, 12 may move to the next station. For example, after vehicle 10 is done being serviced at station 20, the vehicle 10 may proceed to service station 30 for tire assembly inspection.

Each service station 20, 30 may have separate tooling necessary to performing the maintenance tasks corresponding to the respective station. For example, the service station 20 includes a rack 26 storing fluids which may be replaced during maintenance, along with fluid lines 24, which may route to larger tanks of fluids (e.g., different types of oil) that are commonly replaced during maintenance of a vehicle. Similarly, service station 30 includes a compressed air line 34, which may be used to refill tires (e.g., to a desired tire pressure). Both service stations 20, 30 include a tool cart 22, 36 respectively. These tool carts 22, 36 may contain tooling necessary for performing the maintenance tasks for each service station 20, 30. For example, the tool cart 22 may include wrenches or sockets in common sizes necessary to loosen drain plugs on oil pans. As another example, the tool cart 36 may include an impact driver and common socket sizes for removing and tightening lug nuts on a tire. Each service station 20, 30 also includes a lift 28, 32 for performing the maintenance tasks, although other service stations that are not depicted may not include a lift in certain instances.

Even though efficiency may increase by separating the maintenance tasks into different service stations 20, 30, the performance of certain maintenance tasks may still be improved. For example, at the service station 30, in some instances, tire assembly inspection may be performed in a manner that requires the service personnel to remove the tire assembly from the vehicle 12 and inspect the tire on the ground. Such inspections are inefficient because only a portion of the tire assembly is visible at any point in time and because requiring a person to move and manipulate the tire at ground level is labor-intensive and physically taxing. Inspecting the full exterior of the tire assembly, for example, requires service personnel to either lift or rotate the tire, or to roll the tire along the ground, which takes up additional space and poses additional injury risk. In addition, the tire is not at an efficient height for inspection, requiring service personnel to bend over the tire to inspect it, which leaves parts of the tire assembly difficult to see (e.g., side portions of the tire assembly) and inspect. Furthermore, bending can create injury risk over time. For example, in a typical day, the service station 30 may service 40-50 vehicles or more, each with four (4) tires for inspection. Personnel working at the station 30 may therefore be required to lift and inspect 200 or more tires in a day. Given that a typical tire assembly may weigh between 40 and 50 pounds, inspecting such a larger number of tires can create injury risk (e.g., lower back injury risk). Furthermore, if a problem is identified with the tire assembly, the service personnel may have to carry or roll the tire assembly to another location for repair.

To solve these technical problems, among others, the present disclosure involves a tire assembly service cart that can be utilized to efficiently and effortlessly to move and manipulate a tire assembly during tire assembly inspection and servicing. The tire assembly service cart may include support structures that support the tire assembly for inspection at a height above the ground sufficient to reduce injury risk to support personnel (e.g., approximately chest height for the personnel). The tire assembly service cart may also include rollers that allow the tire assembly to rotate while supported by the cart without requiring service personnel to lift the tire assembly or otherwise move within the service station 30. In certain implementations, the tire assembly service cart may include two support structures so that two tires can be supported and inspected simultaneously and/or without having to remove one of the tires from the tire assembly service cart.

Figure 2A:
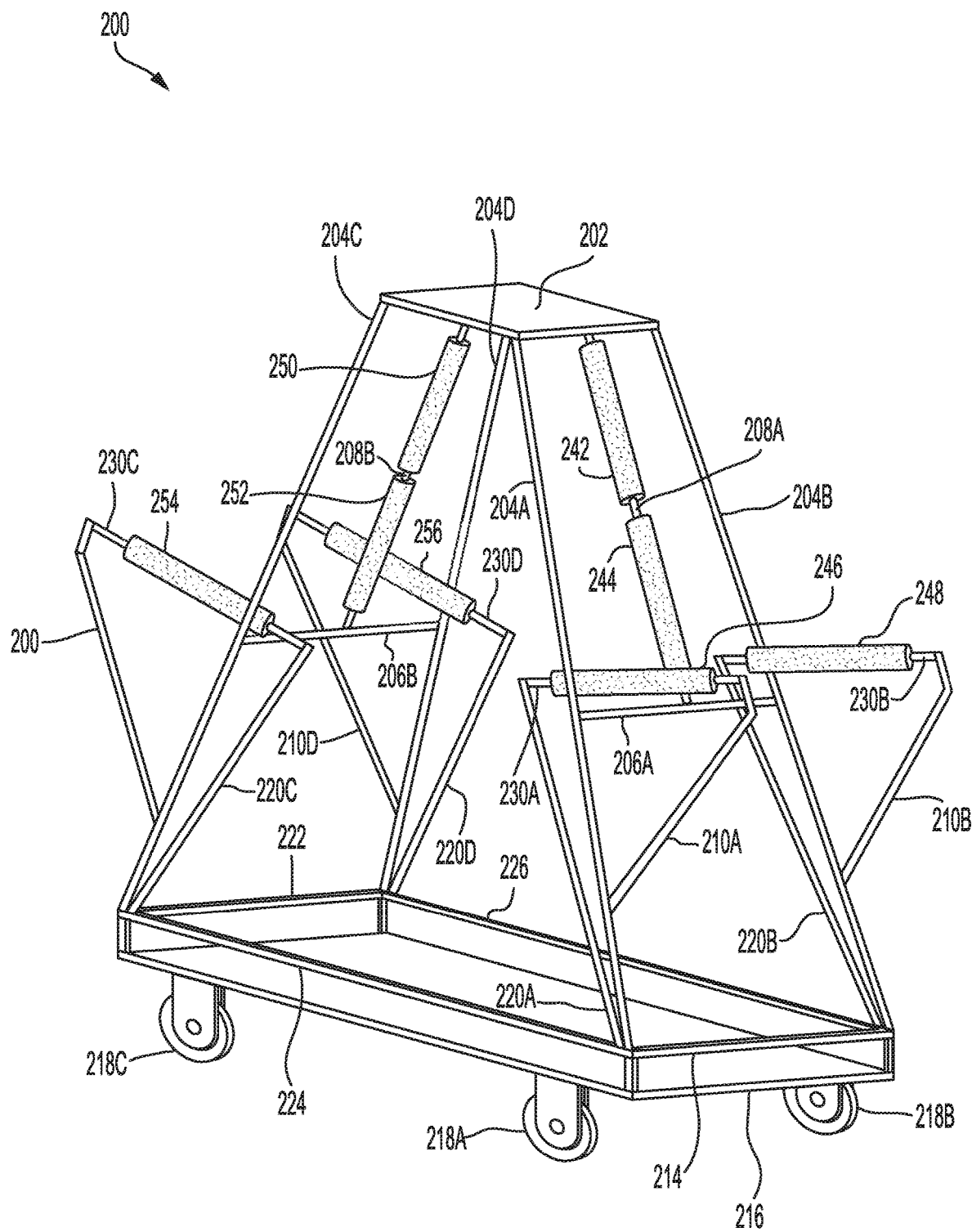
FIGS. 2A-2D illustrate a tire assembly service cart according to an exemplary embodiment of the present disclosure.
Figure 2B:
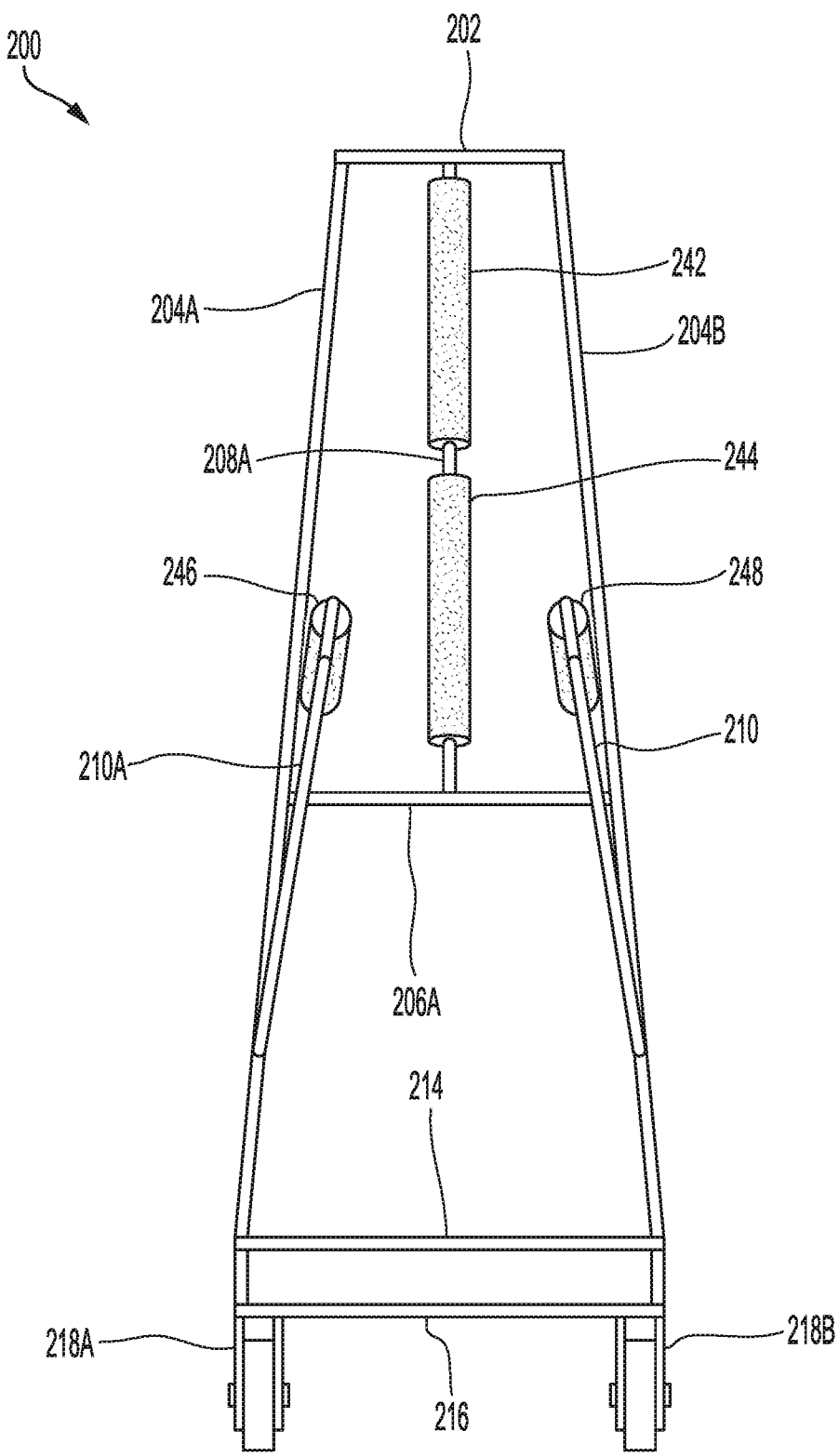
Figure 2C:
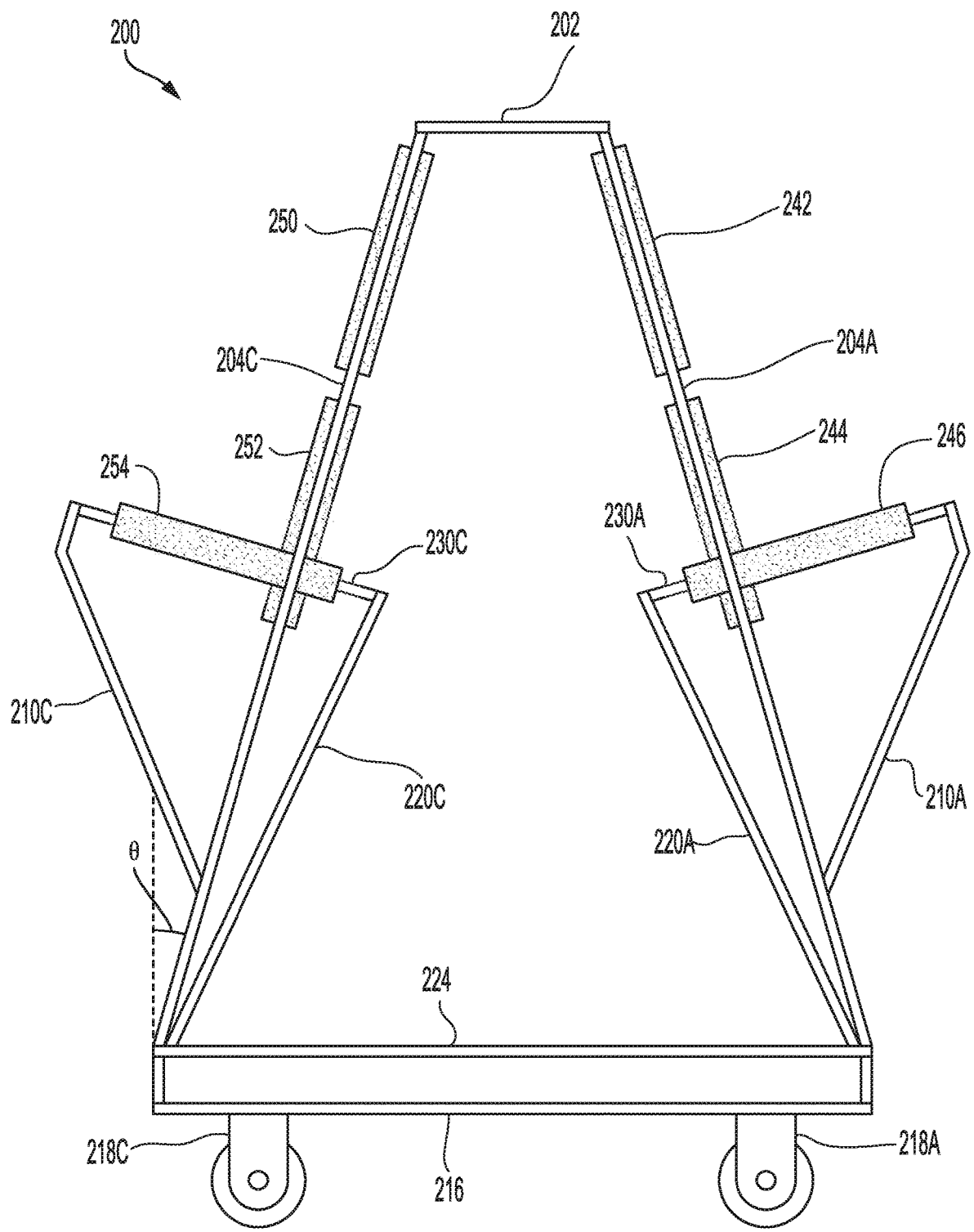
Figure 2D:
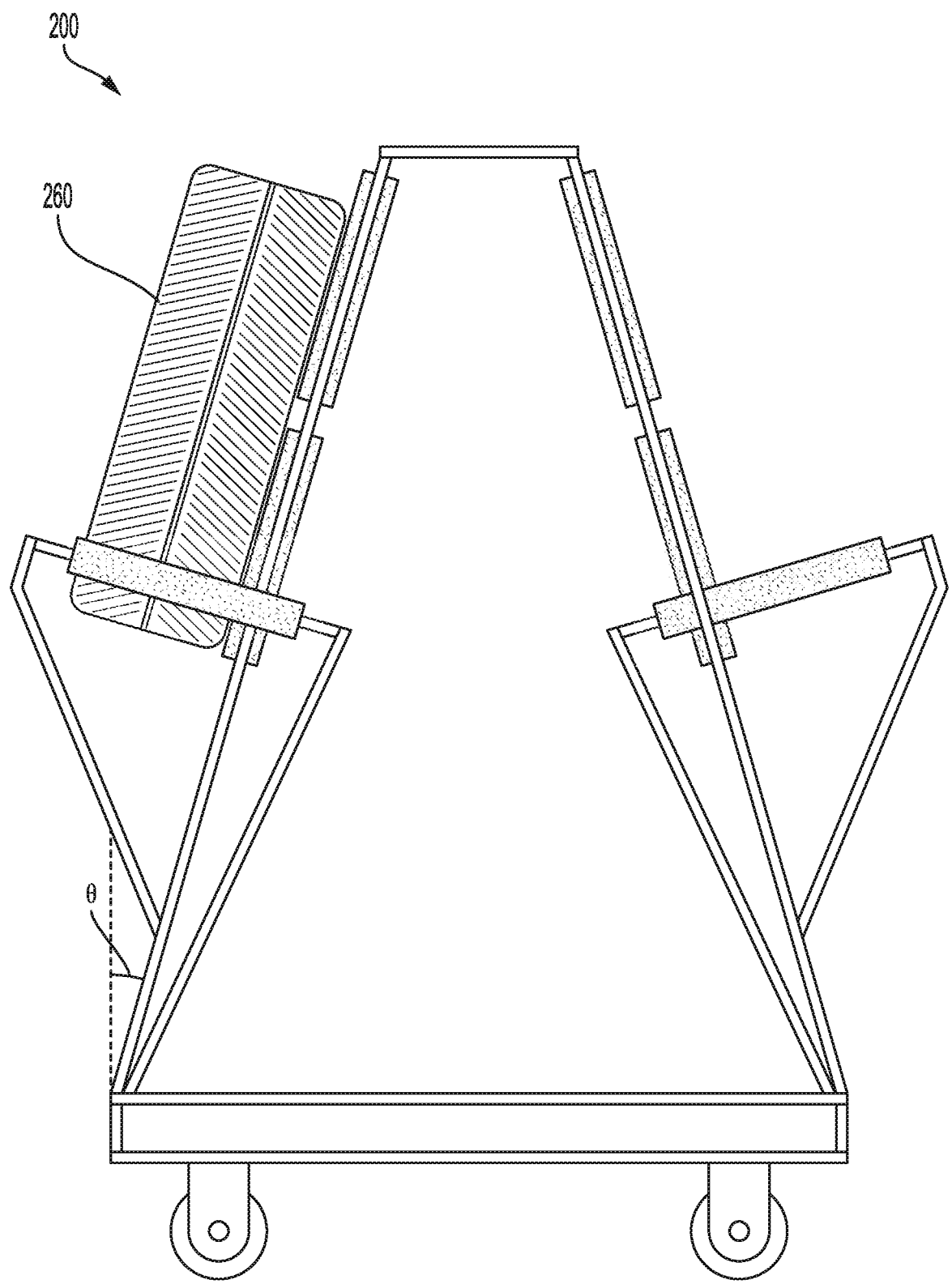

FIGS. 2A-2D depict a tire assembly service cart 200 according to an exemplary embodiment of the present disclosure. In one specific example, the tire assembly service cart 200 may be used for service in the service facility 100. The tire assembly service cart 200 includes bottom support members 230A-D that are positioned to support a tire assembly 260 from the bottom. The tire assembly service cart 200 also includes side support members 208A-B that are positioned to support the tire assembly 260 from the side. For example, as shown in FIGS. 2C and 2D, although tire assembly 260 is supported on a lean angle θ and does not sit vertically, the bottom support member 230C supports the tire assembly 260 from the bottom and the side support member 204C supports the tire assembly 260 from the side. The bottom support members 230A-D are separated from one another to support tire assemblies 260 of various sizes. For example, the bottom support members 230A-B and 230C-D on either side of the tire assembly service cart 200 may be positioned between 15 and 25 inches apart and, in preferred embodiments, may be positioned between 15 and 18 inches apart. The bottom support members 230A-D are also positioned at a height above the bottom of the tire assembly service cart 200 to enable efficient tire assembly 260 inspection. For example, the bottom support members 230A-D may be positioned at a height such that a center of the tire assembly 260 is at approximately chest height for a typical service technician (e.g., the bottom support members 230A-D may be positioned between 36 and 54 inches from the bottom of the tire assembly service cart 200). In preferred embodiments, the bottom support members 230A-D may be positioned at a height of 36 to 48 inches from the bottom of the tire assembly service cart 200.

The side support members 208A-B and the and the bottom support members 230A-D include rollers. In particular, the bottom support members 230A-D each have one bottom roller 246, 248, 254, 256. When a tire assembly 260 is positioned on the bottom support members 230A-D, the bottom rollers 246, 248, 254, 256 may rotate in the same direction with the tire assembly 260 while it is rotated during inspection. For example, when the tire assembly 260 is rotated, the bottom rollers 254, 256 may rotate in the same direction to allow the tire assembly 260 to rotate (e.g., the bottom rollers 254, 256 may both rotate clockwise when the tire assembly 260 rotates counterclockwise).

Also, the side support members 208A-B each have side rollers: upper side rollers 242, 250 and lower side rollers 244, 252. The side rollers 242, 244, 250, 252 may be positioned to continue supporting a tire assembly 260 from the side while rotated during inspection. In such implementations, because the tire assembly 260 can continue leaning against the side support member 208A-B for support, service personnel may not have to lift or support the tire assembly 260 during rotation and can instead focus on performing the inspection of the tire assembly 260. To enable rotation of the tire assembly 260, the upper side roller 242, 250 and the lower side roller 244, 252 may rotate in opposite directions from one another (e.g., the upper side roller 250 may rotate towards the left and the lower side roller 252 may rotated towards the right when the tire assembly 260 is rotated counterclockwise. In one example, the tire assembly 260 may rotate in a circular motion around a rotation axis (e.g., a fixed axis) or center point of rotation.

The side rollers 242, 244, 250, 252 may be positioned to cover different sizes of tire assemblies 260 (e.g., tire assemblies 260 ranging from 20 to 35 inches in outer diameter. For example, the side rollers 242, 244, 250, 252 may each be 8 to 12 inches long and may be separated by 5 to 12 inches. In preferred embodiments, the side rollers 242, 244, 250, 252 may be 10 inches long and may be separated by 5-7 inches. Although the upper side rollers 242, 250 and lower side rollers 244, 252 are similar sizes as depicted, certain implementations may utilize different sized rollers for the upper side rollers 242, 250 and the lower side rollers 244, 252. The bottom rollers 246, 248, 254, 256 may also be the same or different size as the side rollers 242, 244, 250, 252.

In certain implementations, one or more of the side rollers 242, 244, 250, 252 and the bottom rollers 246, 248, 254, 256 may be implemented as conveyor rollers, as depicted. However, other implementations are possible, including bearings, solid rollers, and/or pipe rollers. The side rollers 242, 244, 250, 252 and the bottom rollers 246, 248, 254, 256 may be implemented using the same or different types of rollers. For example, the bottom rollers 246, 248, 254, 256 may typically support more weight and deal with greater loads than the side rollers 242, 244, 250, 252 and may therefore be implemented with heavier duty rollers than the side rollers 242, 244, 250, 252 or different types of rollers to accommodate the greater loads.

Furthermore, although the side support members 208A-B are depicted as including two side rollers 242, 244, 250, 252 each, implementations using more or fewer side rollers 242, 244, 250, 252 are possible. For example, each side support member 208A-B may only include a single side roller 242, 244, 250, 252. In other implementations, the side support member 208A-B may include more than two rollers (e.g., three, four, or more rollers). Such configurations may increase the compatibility of the tire assembly cart 200 with tire assemblies 260 of different sizes. For example, the top half of smaller tire assemblies 260 may overlap with the lower side rollers 244, 252. In such instances, as the tire assembly 260 rotates, a portion may drag against the lower side roller 244, 252 because the lower side roller 244, 252 rotates in a direction opposite that of the top portion of the tire assembly 260. However, if the lower side roller 244, 252 includes multiple rollers, a roller overlapping with a top portion of the tire assembly 260 may be free to rotate with the top of the tire assembly 260, while a roller overlapping with the bottom portion rotates with the bottom of the tire assembly 260. Similarly, although the bottom support members 230A-D are depicted as including a single bottom roller 246, 248, 254, 256 each, the bottom rollers 246, 248, 254, 256 may also be implemented with additional rollers. For example, one or more of the bottom rollers 246, 248, 254, 256 may be implemented with additional rollers (e.g., two, three, or four rollers).

The side support member 208A-B and the bottom support members 230A-D may cooperatively form a support structure of the tire assembly service cart 200. Although depicted as including two support structures, in certain implementations, the tire assembly service cart 200 may only include a single support structure. For example, in alternative implementations, the tire assembly service cart 200 may only include the support structure formed by the side support member 208B and the bottom support members 230C-D. In implementations where the tire assembly service cart 200 includes two support structures, the support structures may be joined, as depicted, by an upper member 202 and at least one lower member 216. As depicted, the upper member 202 and lower member 216 may be formed of a solid sheet of material but may also be formed of multiple structural members (e.g., connecting the lower corners of the tire assembly service cart 200 similar to the structural members 214, 222, 224, 226). In certain implementations, the bottom support members 230A-D may be coupled to the side support member 208A-B by one or more structural member. For example, in the tire assembly service cart 200, the bottom support members 230A-D are connected to the side support members 208A-B by structural members 210A-D, 220A-D, vertical members 204A-D, and horizontal members 206A-B. In particular, the bottom support members 230A-D connect directly to the structural members 220A-D, 230A-D and the side support member 208A-B connects directly to the horizontal members 206A-B. The vertical members 204A-D connect the structural members 220A-D, 230A-D and the horizontal 206A-B and also connect to the upper member 202 and the structural members 214, 222, 224, 226. In other implementations, the vertical members 204A-D may connect to the lower member 216 directly.

As depicted, the bottom support members 230A-D and the side support members 208A-B are arranged essentially perpendicular to one another to support the tire assembly 260. Other implementations may be utilized, including an angle between the bottom support members 230A-D and the side support members 208A-B greater than 90°, which may allow for easier loading and unloading of the tire assembly 260 (e.g., because the protruding end of the bottom support member 230A-D may be lower, making it easier to put the tire assembly 260 on the tire assembly service cart 200.

Figure 5B:
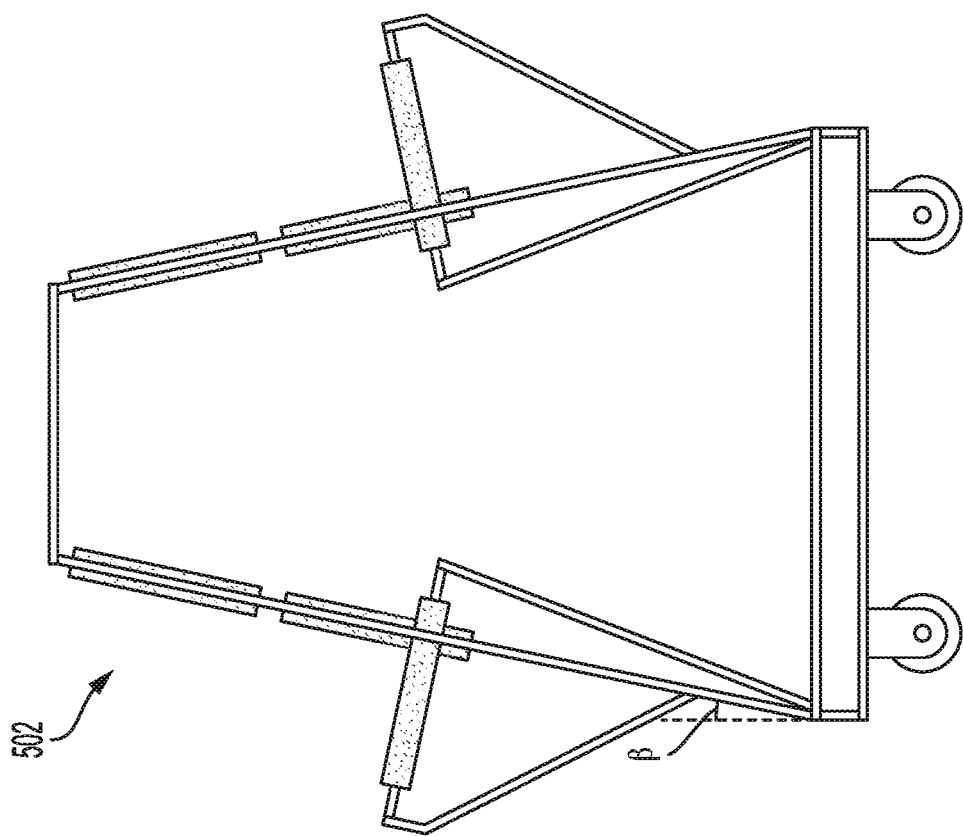
FIGS. 5A-5B illustrate tire assembly service carts according to exemplary embodiments of the present disclosure.
Figure 5A:
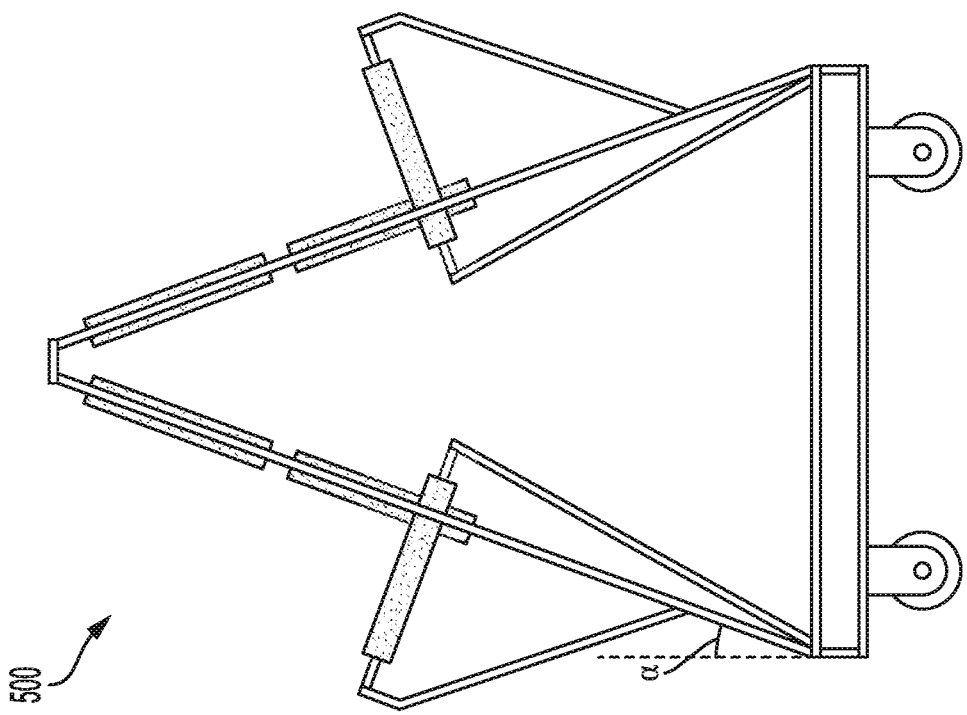

Furthermore, the side support member 208A-B is tilted at a lean angle θ away from vertical. A side support member 208A-B tilted with a lean angle θ may enable more secure loading of the tire assembly 260. For example, if a tire assembly 260 is positioned vertically on the tire assembly service cart 200, the tire assembly 260 may fall off of the tire assembly service cart 200 if the tire assembly service cart 200 is bumped or moved. However, the lean angle θ may prevent the tire assembly 260 from falling off the tire assembly service cart 200 after such bumps or movement, with a larger lean angle θ preventing falling from greater bumps or movement. In certain implementations, the lean angle θ may be between 5° and 20°, although other values are also possible. For example, the lean angle θ of the tire service cart 200 is approximately 10°. As additional examples, the tire assembly service carts 500, 502 in FIGS. 5A-5B have lean angles α and β of approximately 20° and 10°, respectively.

It should also be appreciated however, that implementations of the tire service cart 200 with no lean angle are also contemplated. For example, as the lean angle θ increases, the protruding ends of the bottom support members 230A-D rise higher relative to the interior ends of the bottom support members 230A-D. Therefore, higher lean angles θ may require service personnel to lift the tire assembly 260 higher when loading the tire assembly 260 onto the tire assembly service cart 200. In instances where such operations are undesirable, and/or where movement and bumping concerns are reduced, the tire assembly service cart 200 may not have a lean angle θ, and the tire assembly 260 may be supported vertically on the tire assembly service cart 200.

Figure 3:
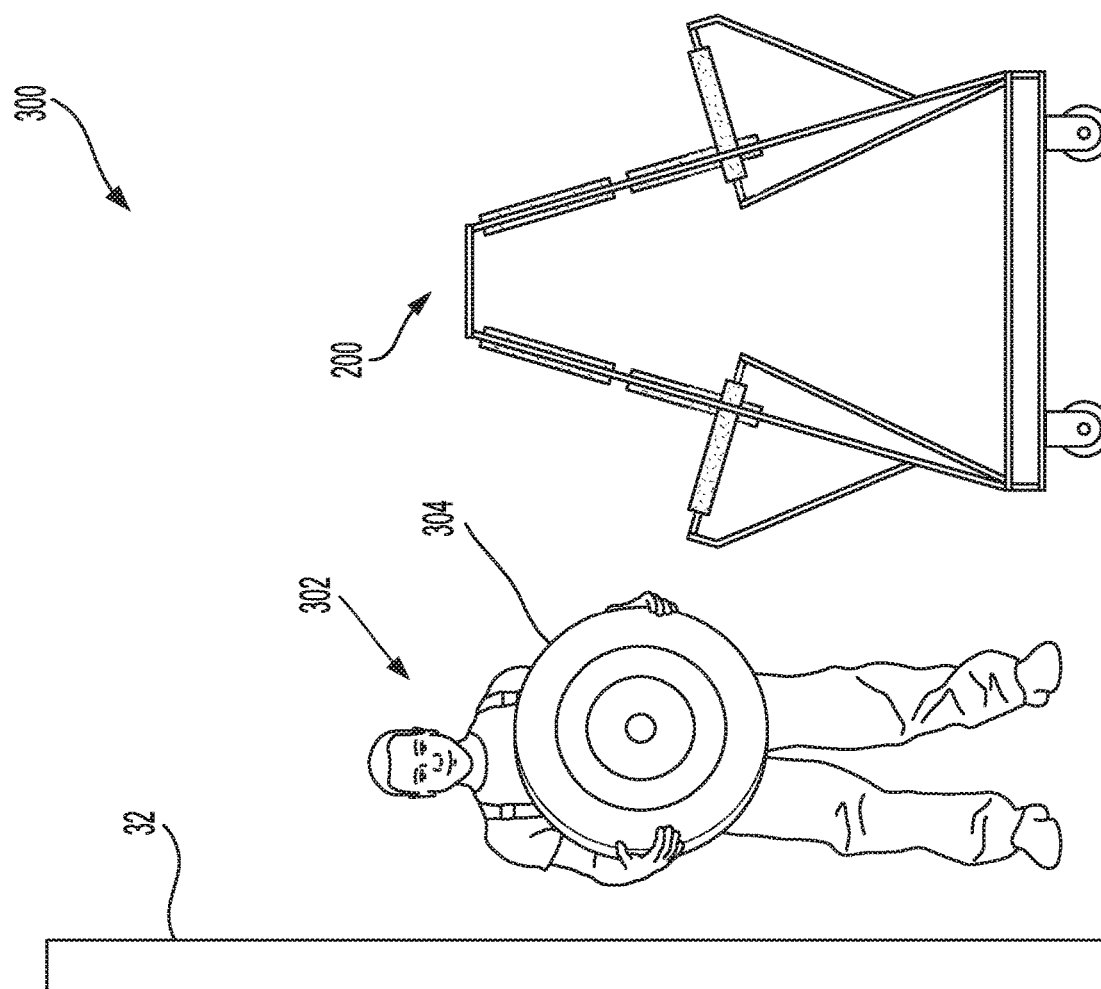
FIG. 3 illustrates a service station according to an exemplary embodiment of the present disclosure.

The tire assembly service cart 200 also includes wheels 218A-D (wheel 218D not depicted). The wheels 218A-D may enable easier movement of the tire assembly service cart 200. For example, the tire assembly service cart 200 may be positioned near a vehicle 12 for servicing at a station 30 so that the tire assembly 260 does not have to be carried far to enable a service technician to perform maintenance on the service cart. In particular, FIG. 3 depicts a service station 300 in which the tire assembly service cart 200 is positioned near the vehicle 12, which is raised on the lift 32. As can be seen, the lift 32 is raised such that the tire assembly of the vehicle 12 is at approximately chest height for the service technician 302. Using the wheels, the tire assembly service cart 200 may be positioned on the other side of the service technician 302 so that the service technician 302 only has to turn after removing the tire assembly 304 from the vehicle 12 to position the tire assembly 304 on the tire service cart 200. This may increase efficiency because the tire assembly 304 can be inspected faster and more efficiently on the tire service cart 200 because the service technician 302 can inspect the tire assembly 304 on the cart, which allows for immediate and in-place rotation and inspection. Further, since removal and inspection of the tire assembly 304 occurs at chest height, injury risk to the service technician 302 may be reduced because the service technician 302 does not have to lift the tire assembly 304 or lean over to inspect the tire assembly 304 on the ground. As depicted, the tire assembly service cart 200 is located on an opposite side of the service technician 302 from the vehicle 12. However, the tire assembly service cart 200 may also be placed alongside the vehicle 12. For example, the service technician 302 may position the tire assembly service cart between the wheel wells of the vehicle 12. In this way, both tire assemblies 304 on the same side (e.g., driver or passenger side) of the vehicle 12 may be easily loaded on the tire assembly service cart 200 (e.g., each tire assembly 304 may be loaded onto a support structure of the tire assembly service cart 200). In such instances, the tire assembly service cart 200 may be rotated, using the wheels 218A-D, to switch tire assemblies 304 (e.g., during a tire rotation). In still further implementations, the tire assembly service cart 200 may be positioned beneath the tire assembly 304 as it is removed from the vehicle 12, allowing the tire assembly 304 to fall into and be positioned on the tire assembly support cart 200 without the service technician 302 having to pick up or hold the tire assembly 304 at all. In certain implementations, the wheels 218A-D may be implemented using caster wheels to enable easier movement and rotation of the tire assembly service cart 200, although other implementations using different types of wheels are also possible.

Figure 4:
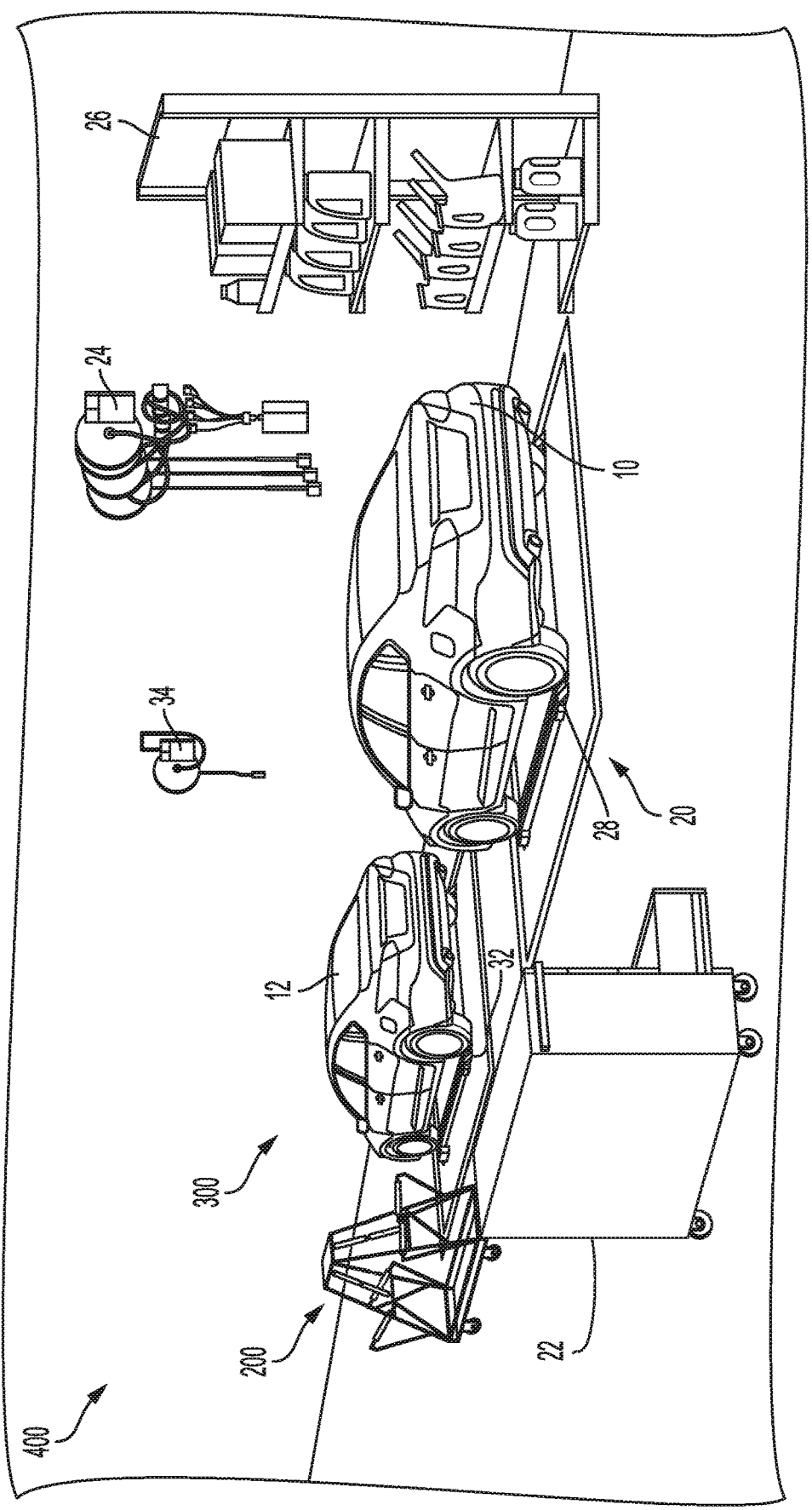
FIG. 4 illustrates a service facility according to an exemplary embodiment of the present disclosure.

The service station 300 may be located in a service facility similar to the service facility 100. For example, FIG. 4 depicts a service facility 400 including the station service 300 and the service cart 200, as well as the service station 20 of the facility 100. Accordingly, the tire assembly service cart 200 can be used to enhance the station-based maintenance facilities discussed above, further improving service times and overall facility throughput as increasingly necessary for servicing vehicle fleets. Furthermore, the portability of the tire assembly service cart 200 may allow the service facility 400 to combine multiple service stations 20, 300. For example, instead of having a separate tire inspection station 300, tire assemblies 260, 304 can be removed from a vehicle 12 and placed on the tire assembly service cart 200. The tire assembly service cart 200 can then be moved away from the vehicle 12 for inspection of the tire assemblies 260, 304. Other maintenance tasks, such as fluid checks and replacements may then be performed in parallel while the tire assemblies 260, 304 are inspected. Such configurations may save space within a service facility 400 and performing maintenance tasks in parallel may reduce overall service times for vehicles 12, while also increasing overall vehicle throughput for the service facility 400.

Figure 6B:
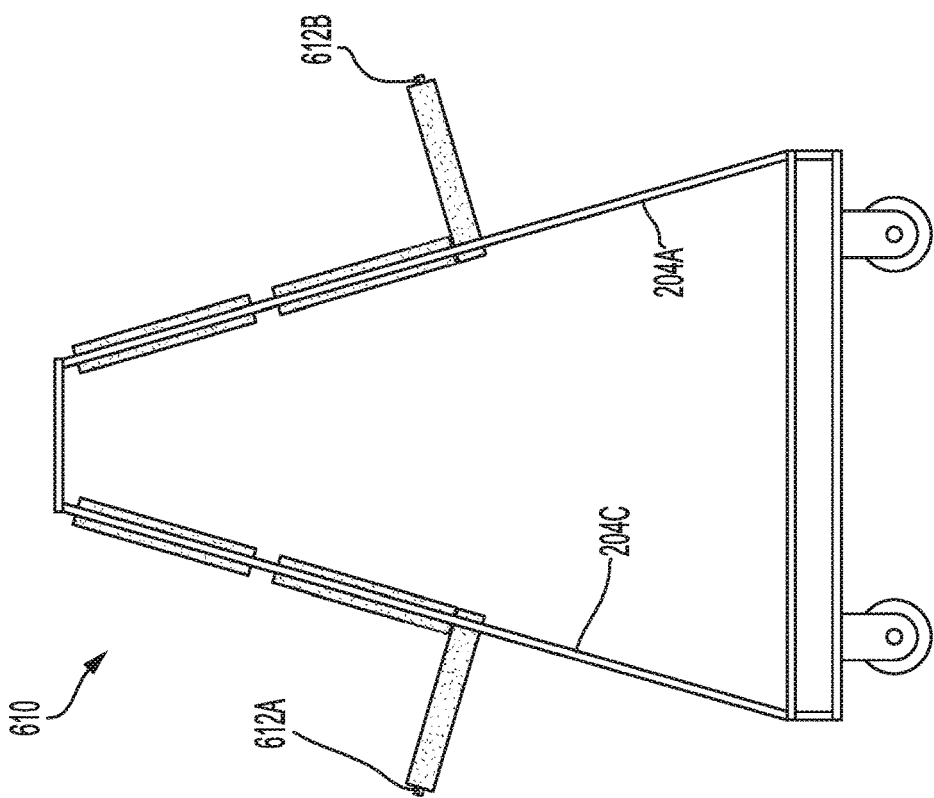
FIGS. 6A-6B illustrate tire assembly service carts according to exemplary embodiments of the present disclosure.
Figure 6A:
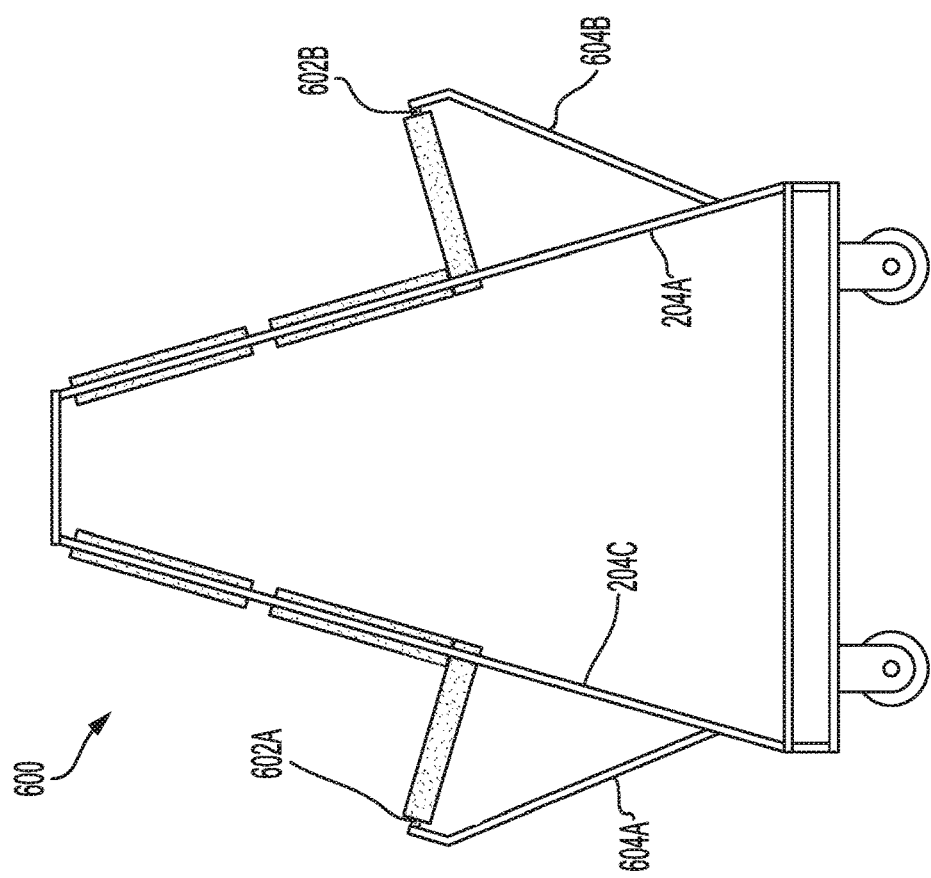

In addition to the above discussed and depicted embodiments of the tire assembly service cart 200, 500, 502, further implementations may also be utilized. For example, FIGS. 6A-6B depict tire assembly service carts 600, 610 with different support member implementations. In particular, the tire assembly service cart 600 includes bottom support members 602A-B with support members 604A-B connecting the protruding ends of the bottom support members 602A-B to the vertical support member 204A, C, respectively. The tire assembly service cart 600 may be achieved by removing the structural members 220A-D coupled to the interior ends of the bottom support members 230A-D. In certain implementations, further stability for the bottom support members 602A-B may be achieved by coupling the interior end of the bottom support members 602A-B to the horizontal member 206A-B. The tire assembly service cart includes bottom support members 612A-B without additional structural members. For example, instead of utilizing structural members 210A-D, 220A-D, the bottom support members 612A-B may connect directly to one or both of the vertical member 204A-D and the horizontal member 206A-B. In light of the present disclosure, additional structural member configurations may be apparent to one skilled in the art that provide sufficient stability for the bottom support members 246, 248, 254, 256, 602A-B, 612A-B. The present disclosure expressly contemplates such configurations.

Figure 7B:
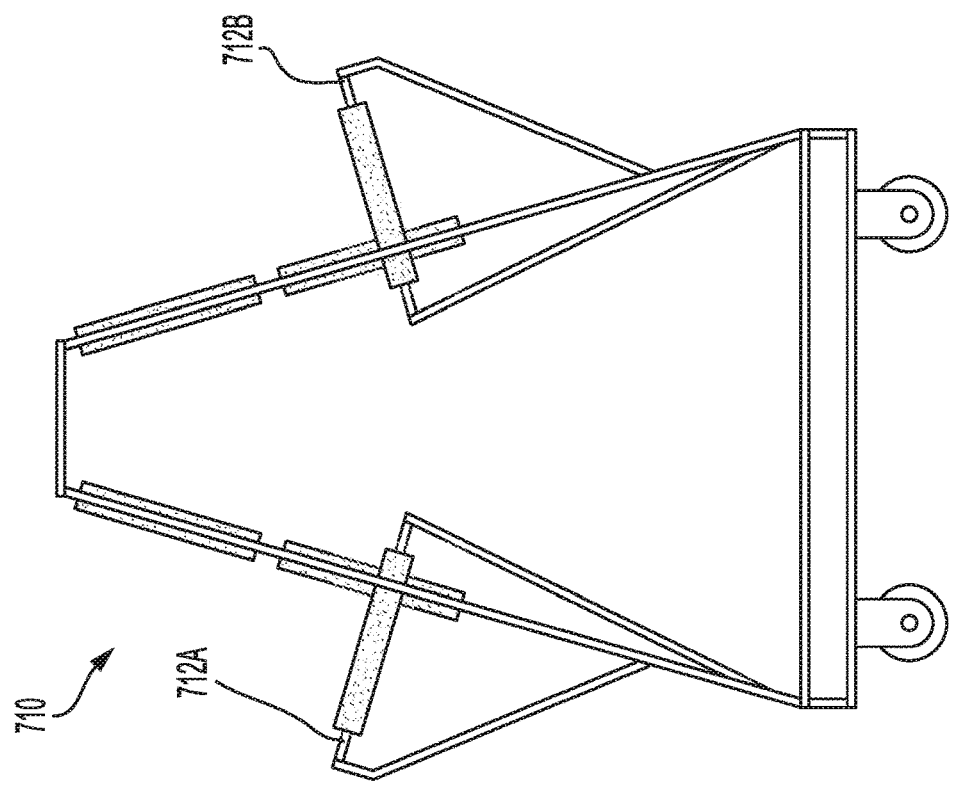
FIGS. 7A-7B illustrate tire assembly service carts according to exemplary embodiments of the present disclosure.
Figure 7A:
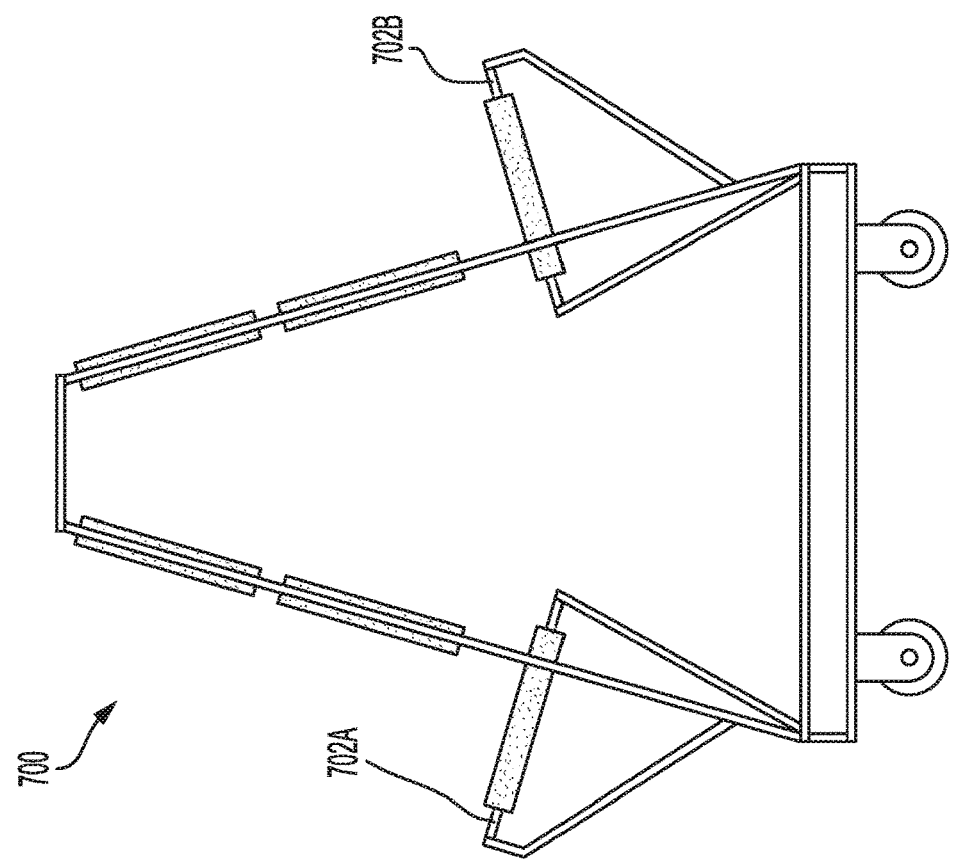

FIGS. 7A-7B depict tire assembly service carts 700, 710 with different bottom support member heights. In particular, the tire assembly service cart 700 has bottom support members 702A-B at a lower height than the bottom support members 230A-D of the tire assembly service cart 200. The tire assembly service cart 710 has bottom support members 712A-B at a higher height than the bottom support members 230A-D. In practice, as mentioned above, the height of the bottom support members 230A-D, 702A-B, 712A-B may be selected such that a service technician 302 can load and inspect a tire assembly 260, 304 at approximately chest height. Different tire assemblies 260, 304 may have different heights, however, so the height of the bottom support members 230A-D, 702A-B, 712A-B may be selected based on the intended tire assembly 260, 304 for inspection. For example, tire assemblies 260, 304 with a larger outer diameters may require a tire assembly service cart 700 with lower bottom support members 702A-B to be supported at chest height for inspection (e.g., with a center of the tire assembly 260, 304 at chest height). Tire assemblies 260, 304 with smaller outer diameters may require a tire assembly service cart 710 with higher bottom support members 712A-B to be supported at chest height for inspection.

A service facility 400 may typically service tire assemblies 260, 304 in a common size range (e.g., tire assemblies 260, 304 have outer diameters ranging from 20 to 35 inches). The service facility 400 may therefore utilize one or more tire assembly service carts 200 with bottom support members 230A-D at a height to properly inspect these tires. However, the service facility 400 may occasionally service larger or smaller tire assemblies 260, 304 and may therefore also have tire assembly service carts 700, 710 with bottom support members 702A-B, 712A-B at heights suitable for these larger or smaller tire assemblies 260, 304.

In still further implementations, the height of the bottom support members 230A-D may be adjustable. For example, the tire assembly cart 200 may allow for the height of the bottom support members 230A-D to be adjustable to one or more higher heights (e.g., the height of the bottom support members 712A-B) and/or one or more lower heights (e.g., the height of the bottom support members 702A-B). The height may be adjustable by removing and repositioning the bottom support members 230A-D. For example, the tire assembly service cart 610 does not include additional support members supporting its bottom support members 612A-B. These bottom support members 612A-B may therefore be removable, e.g., by removing fasteners attaching the bottom support members 612A-B and/or by removing the bottom support members 612A-B from mounting mechanisms on the tire assembly service cart 600. Once removed, the bottom support members 612A-B may be remounted or reattached at a different height on the tire assembly service cart 610. For example, the bottom support members 612A-B may be reattached by reconnecting the fasteners attaching the bottom support members 612A-B to the tire assembly service cart 610, and/or by remounting the bottom support members 612A-B in a mounting mechanism at a different height. Similar height adjustment mechanisms may be used for implementations of the tire assembly service cart 200, 600 with structural members 210A-D, 220A-D, 604A-B attached to the bottom support member 230A-D, 602A-B. For example, in such implementations, the structural members 210A-D, 220A-D, 604A-B may also be removed and reattached or remounted on the tire assembly service cart 200, 600 to change the height of the bottom support members 230A-D, 602A-B.

Height adjustable tire assembly service carts may have several advantages. First, rather than having to maintain multiple tire assembly service carts 200, 700, 710, height adjustment may allow the same tire assembly service cart to be utilized for tire assemblies 260, 304 of different sizes. This may help reduce the space within a service facility 400, (e.g., a service station 300) occupied by tire assembly service carts 200, which may increase both safety and service technician 302 efficiency. Also, height adjustment may make the tire assembly service carts easier and safer to user for service technicians 302 of different heights. For example, chest height for one service technician 302 may be lower than chest height for another. Therefore, these two service technicians 302 would benefit from the bottom support members 230A-D at different heights corresponding to their chest heights during inspection. Height adjustment as discussed above may enable these technicians to utilize the same tire assembly service carts 200 without having to change the equipment at a station 300.

It should also be noted that, although the depicted tire assembly service carts 200, 500, 502, 600, 610, 700, 710 include bottom support members 230A-D, 602A-B, 612A-B, 702A-B, 712A-B at the same height, it is possible for the bottom support members 230A-D, 602A-B, 612A-B, 702A-B, 712A-B of a tire assembly service cart 200, 500, 502, 600, 610, 700, 710 to have bottom support members 230A-D, 602A-B, 612A-B, 702A-B, 712A-B at different heights. For example, one side of the tire assembly service cart 200, 500, 502, 600, 610, 700, 710 may have bottom support members 230A-D, 602A-B, 612A-B, 702A-B, 712A-B at a lower height than the other side of the tire assembly service cart 200, 500, 502, 600, 610, 700, 710. Such implementations may be useful where two service technicians 302 are using the same tire assembly service cart 200, 500, 502, 600, 610, 700, 710. For example, one service technician 302 may be inspecting tire assemblies 260, 304 from the front of a vehicle 12 while another service technician inspects tire assemblies 260, 304 from the rear of the vehicle 12. If these service technicians 302 are different heights, they may require or prefer bottom support members 230A-D, 602A-B, 612A-B, 702A-B, 712A-B at different heights and may independently adjust the bottom support members 230A-D, 602A-B, 612A-B, 702A-B, 712A-B to their preferred height. Such adjustability may therefore improve ergonomics and service technician 302 comfort, resulting in efficiency gains and injury risk reduction.

Figure 8:
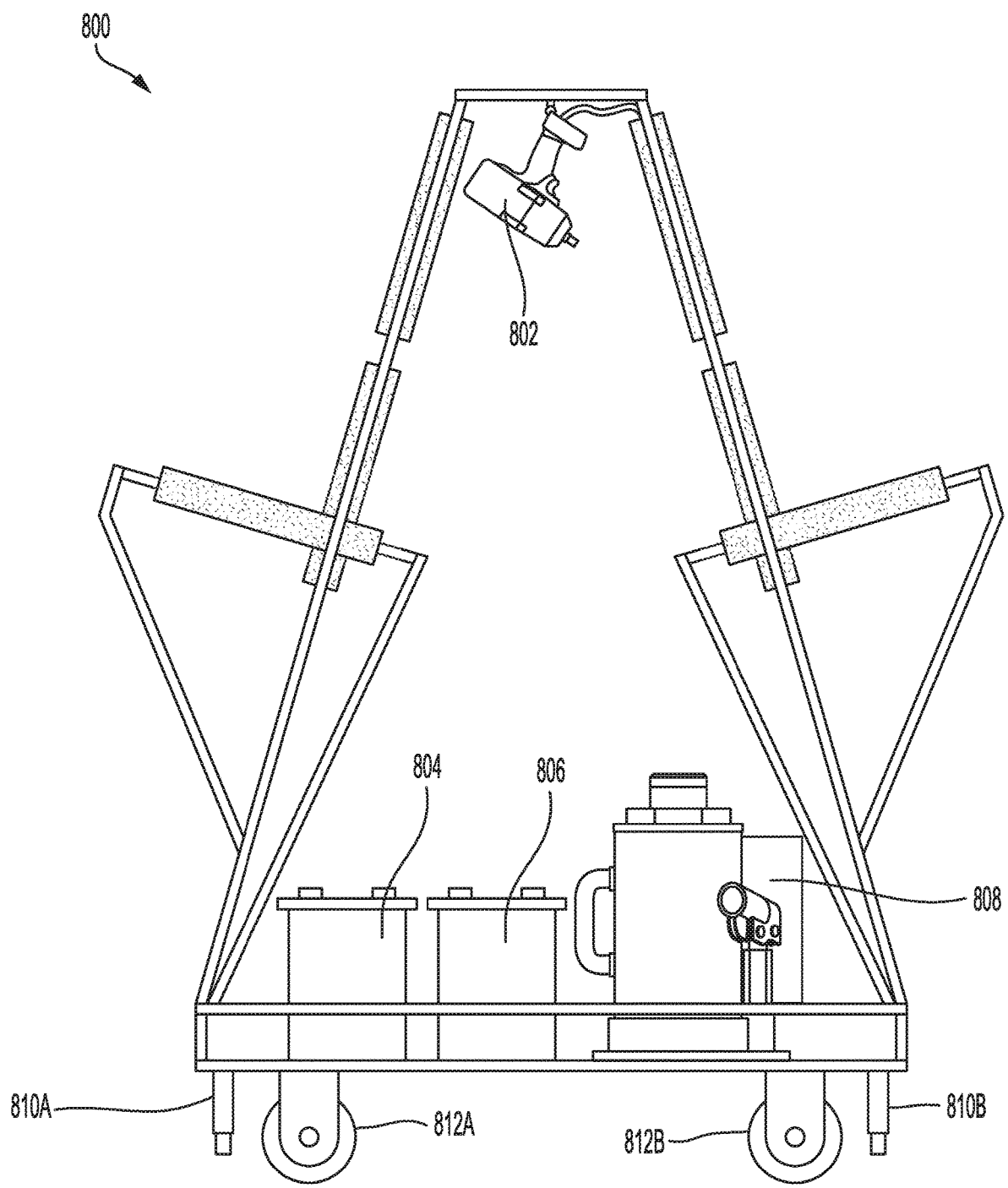
FIG. 8 illustrates a tire assembly service cart according to an exemplary embodiment of the present disclosure.

FIG. 8 depicts a tire assembly service cart 800 providing tool storage (e.g., in lieu of a tool cart 36). For example, the tire assembly service cart 800 includes an impact driver 802, e.g., for removing lug nuts. The tire assembly service cart 800 may also include storage for additional tools, such as wrenches, lights, and other tooling required to remove and inspect tire assemblies 260, 304. For example, additional tool mounting points may be provided in an interior of the tire assembly service cart 800. These mounting points may be included using, for example, a mounting surface (e.g., shadow board) with additional hooks or other tool supports and/or shelving installed on an interior of the tire assembly service cart 800. In still further implementations, the tire assembly service cart 800 may include tooling to repair a tire assembly 260, 304. For example, the tire assembly service cart 800 may include reamers, presses, insertion tools, or other tooling to repair a tire assembly 260, 304 (e.g., to insert a rope plug).

The tire assembly service cart 800 may also include storage on the bottom for one or more batteries 804, 806 and a compressed air tank 808. The batteries 804, 806 and/or the compressed air tank 808 may be used to power tools such as the impact driver 802 used during removal and inspection of a tire assembly 260, 304. Furthermore, the batteries 804, 806 may power one or more computing devices (e.g., personal computers, laptop computer, tablet computers, or other computing devices). Such computing devices may be mounted on the tire assembly service cart 800 (e.g., on shelving or a mounting unit installed on the tire assembly service cart 800). The computing device may be utilized to gather information regarding a vehicle 12 for which service is performed. For example, the computing device may plug into the an onboard diagnostic port of the vehicle 12 to gather information such as a vehicle identification number (VIN), current mileage, and any applicable error statuses for the vehicle 12. This information may be maintained over time to monitor whether a vehicle (e.g., a vehicle in a fleet) is properly and regularly serviced. The compressed air tank 808 may also be used, in certain implementations, to perform maintenance actions involving a tire assembly 260, 304. For example, if a service technician 302 notices that the tire pressure of a tire is low, the service technician 302 can use the compressed air tank 808 to fill the tire rather than having to walk over to a compressed air line 34 to fill the tire. Further, in certain implementations, rather than utilizing a compressed air tank 808, the tire assembly service cart 800 may include a compressed air line of its own (e.g., running to a compressed air connection above the service station 300).

Figure 9:
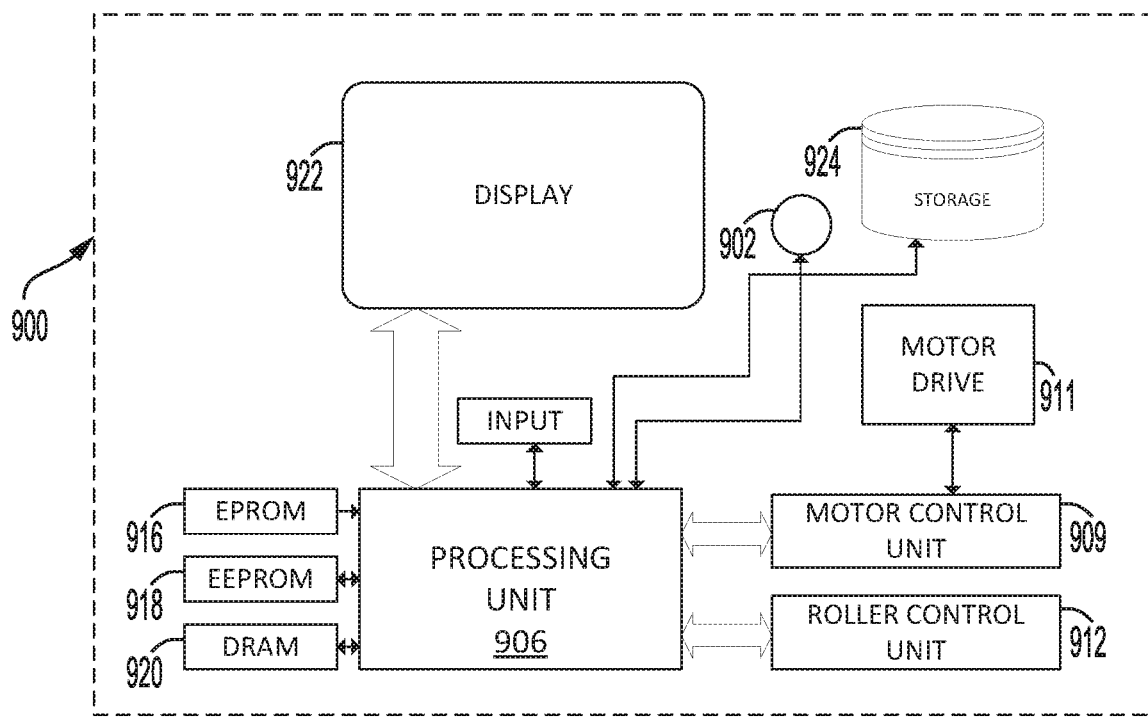
FIG. 9 illustrates a tire assembly service cart processing device according to an exemplary embodiment of the present disclosure.

FIG. 9 illustrates an example of a processing device 900 that may be coupled to a tire service assembly cart, such as the tire assembly service cart depicted in FIGS. 2A-2D. The processing device 900 may be configured with software instructions to automatically control movement of the tire assembly service cart and automatically initiate rotation of a tire assembly, once the tire assembly has been positioned on the tire assembly service cart.

As illustrated in FIG. 9, the computing device 900 may include a sensor 902 (e.g., an optical sensor, camera, etc.) configured to identify (e.g., along a field of view including a vehicle) a tire assembly of the vehicle that requires inspection. More specifically, the sensor 902 may capture image data that may be used to identify the tire assembly. The sensor 902 may be located in a variety of different locations depending upon the particular application for which the sensor 902 is to be utilized. For example, in applications where images of a tire assembly may be captured, the sensor 902 may be located in a position that allows for capture of a field of view including a tire assembly of a vehicle.

The sensor 902 provides captured image data to a processing unit 906. The processing unit 906 processes the image data to determine specific locations of a tire assembly and measure distances to the tire assembly. Additionally, the images may be used to identify features (e.g., problematic features) of the tire assembly. The processing unit 906 generates instructions for a motor control unit 909 that causes a bi-directional, multi-rpm variable torque motor drive 911 to position the tire assembly service cart to a location that allows a technician to easily position a tire assembly onto the tire assembly service cart.

The processing device 900 may also include a roller control unit 912 that is operatively connected to one or more of the rollers depicted in FIGS. 2A-2D including rollers 242, 250, 244, 252. The roller control unit receives rotational instructions from the processing unit 906, causing the roller control unit 912 to initiate rotation of one or more of the rollers (e.g., any of the rollers depicted in FIGS. 2A-2D including rollers 242, 250, 244, 252), thereby causing continuous rotation or incremental rotations of the tire assembly to enable the performance of a tire inspection. The processing unit 906 may process rotational information and/or image data and cause a display 922 (or other interface) to provide such information (or other information and indications) to a service technician. The processing unit 906 may be connected to EPROM program memory 916, EEPROM memory 918 for storing and retrieving non-volatile information such as calibration and vehicle specific specifications, and DRAM memory 920 for temporary data storage.

Optionally, the processing unit 906 of may communicate with one or more additional vehicle services devices included in a service facility, such as the service facility 100. Alternatively, the processing unit 906 may be configured to store the acquired images either locally in an associated data storage 924, remotely over a communications network (e.g., the Internet), and/or the like.

Referring again to FIG. 8, the tire assembly service cart 800 includes vertical lifts 810A-B. The vertical lifts 810A-B may support and stabilize the tire assembly service cart 800 during an inspection operation. For example, the wheels 812 may assist in repositioning the tire assembly service cart 800, but may also cause the tire assembly service cart 800 to shift while a service technician 302 loads a tire assembly 260, 304 for inspection. Such shifts risk injury, as the service technician 302 may drop the tire assembly 260, 304 and harm themselves or others. The shifts also reduce efficiency, as the service technician 302 may require multiple attempts to successfully load the tire assembly 260, 304. Therefore, once the tire assembly service cart 800 is in position for inspection, the service technician may extend the vertical lifts 810A-B so that the ends of the vertical lifts 810A-B contact the ground. In certain implementations, the vertical lifts 810A-B may also lift the tire assembly service cart 800 so that the wheels 812A-B no longer contact the ground. Once the vertical lifts 810A-B are extended, the tire assembly service cart 800 may be prevented from rolling and thereby remain stable during loading and inspection of the tire assembly 260, 304. If, during the inspection, the tire assembly service cart 800 needs to be moved or rotated, the vertical lifts 810A-B can be retracted until the wheels 812A-B can roll again. Further, because the vertical lifts 810A-B are located outside of the wheels 812A-B, the vertical lifts 810A-B may provide further stability once extended. That said, having the air jacks 810A-B outside of the wheels 812A-B may create certain safety risks, for example, of the vertical lift 810A-B pressing into a service technician's 302 foot during extension. Therefore, other implementations may position the vertical lifts 810A-B behind the wheels 812A-B (e.g., closer to the center of the tire assembly service cart 800. Additionally or alternatively, protective shielding may be provided along the bottom of the tire assembly service cart 800 to prevent feet and other body parts from accidentally moving underneath the vertical lifts 810A-B. In certain implementations, the vertical lifts 810A-B may be implemented as air jacks utilizing air from the compressed air tank 808. In other implementations, the vertical lifts 810A-B may be implemented as one or more electric lifts, electric stabilizers, pneumatic lifts, and/or pneumatic stabilizers.

Figure 10:
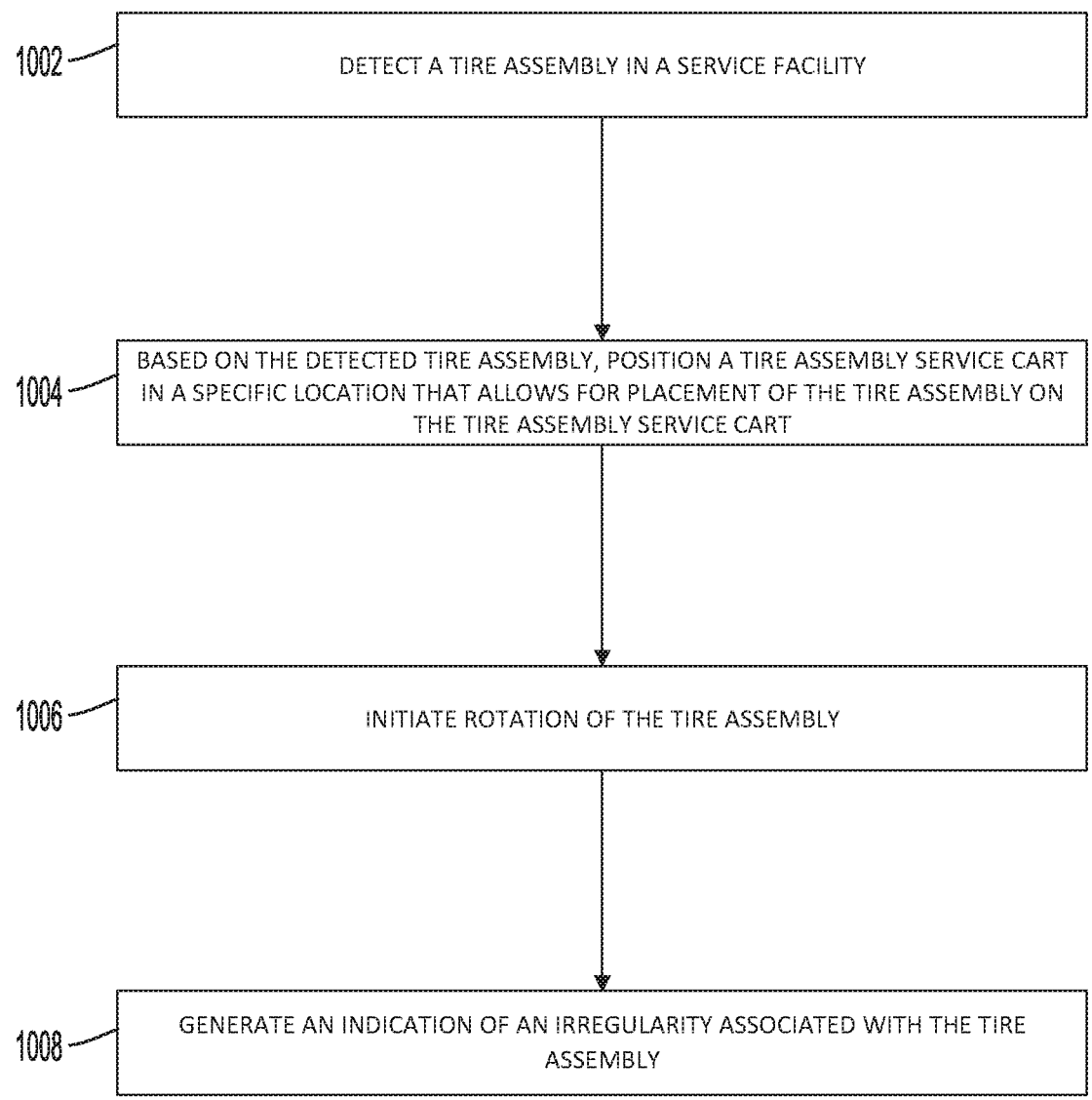
FIG. 10 illustrates a method for servicing a tire assembly using an automated assembly service cart according to an exemplary embodiment of the present disclosure.

FIG. 10 depicts a flowchart of an exemplary method 1000 of servicing a tire assembly of a vehicle located in a service facility, such as the service facility illustrated in FIG. 1. In the illustrated example, the method 900 utilizes a tire assembly service cart containing a processor, such as the service cart 900 described in FIG. 9.

As illustrated in FIG. 10, the method includes detecting a tire assembly at a vehicle (operation 1002). More specifically, the tire assembly service cart may automatically identify the basic dimensions of a tire assembly of the vehicle that is to be demounted from the vehicle. Based on the detection, the tire assembly service cart automatically positions itself at the vehicle in a location that enables a service technician to immediately demount a tire assembly from the vehicle and place the tire assembly onto the tire assembly service cart (operation 1004).

Once the tire assembly has been positioned on the tire assembly service cart, the tire service assembly cart may automatically initiate rotation that either continuously rotates or incrementally rotates the tire assembly to enable the performance of a tire inspection on the tire assembly (operation 1006). In some instances, during automatic rotation of the tire assembly, the processing unit of the tire assembly service cart may capture images of the tire assembly in an attempt to detect irregularities in the tire assembly, when compared to known and accepted tire assembly images. Upon automatic detection of any irregularities with the tire assembly, the service cart may generate an indication of the irregularity for presentation to a service technician (operation 1008). For example, the processing unit of the tire assembly service cart may cause the graphical user-interface to display the signal to a service technician indicating that there is a technical problem with the tire assembly.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A tire assembly service cart comprising:
at least one tire assembly support structure, the at least one tire assembly support structure comprising:
a side support member positioned to support a side portion of a tire assembly positioned on the at least one tire assembly support structure, wherein the side support member includes a first roller and a second roller positioned above the first roller and in line with the first roller; and
a first bottom support member positioned to support a bottom portion of the tire assembly, wherein the first bottom support member comprises a third roller; and
wherein the first roller, the second roller, and the third roller are positioned to allow the tire assembly to rotate around a rotation axis of the tire assembly service cart while supported by the at least one tire assembly support structure.

2. The tire assembly service cart of claim 1, wherein the first roller and the third roller are positioned substantially perpendicular to each other.

3. The tire assembly service cart of claim 1, wherein the rotation axis is substantially perpendicular to the side support member.

4. The tire assembly service cart of claim 1, wherein the at least one tire assembly support structure includes a second bottom support member, wherein the second bottom support member includes a fourth roller, and wherein the second bottom support member is substantially parallel to the first bottom support member.

5. The tire assembly service cart of claim 4, wherein the first bottom support member and the second bottom support member are connected to the side support member.

6. The tire assembly service cart of claim 4, wherein the first bottom support member is coupled to the side support member by at least a first structural member that connects to a protruding end or an interior end of the first bottom support member, and wherein the second bottom support member is coupled to the side support member by at least a second structural member that connects to a protruding end or an interior end of the second bottom support member.

7. The tire assembly service cart of claim 4, wherein the first bottom support member and the second bottom support member are positioned between 15 and 25 inches apart.

8. The tire assembly service cart of claim 4, wherein the first bottom support member and the second bottom support member are positioned between 36 and 54 inches from a bottom of the tire assembly service cart.

9. The tire assembly service cart of claim 1, wherein the first roller and the second roller are spaced apart along the side support member to support tire assemblies ranging from 20 to 35 inches in diameter.

10. The tire assembly service cart of claim 1, wherein the first roller, the second roller, and the third roller include a conveyor roller.

11. The tire assembly service cart of claim 1, wherein the side support member is tilted from vertical with a lean angle.

12. The tire assembly service cart of claim 11, wherein the lean angle is greater than or equal to 5 degrees and less than or equal to 20 degrees.

13. The tire assembly service cart of claim 1, wherein a height of the first bottom support member from a bottom of the tire assembly service cart is adjustable.

14. The tire assembly service cart of claim 1, wherein the tire assembly service cart comprises two tire assembly support structures symmetrically positioned on opposite sides of the tire assembly service cart.

15. The tire assembly service cart of claim 14, wherein the two tire assembly support structures are connected by at least one upper member and at least one lower member.

16. The tire assembly service cart of claim 1, further comprising:
a plurality of vertical lifts positioned to stabilize the tire assembly service cart during servicing of the tire assembly.

17. A tire assembly support structure comprising:
a side support member positioned to support a side of a tire assembly positioned on the tire assembly support structure; and
at least two bottom support members positioned to support the tire assembly from the bottom,
wherein the side support member includes a first roller and a second roller positioned above the first roller and in line with the first roller and the at least two bottom support members include additional rollers that allow the tire assembly to rotate around a rotation axis of the tire assembly support structure, and wherein the rotation axis is substantially perpendicular to the side support member.

18. The tire assembly support structure of claim 17, wherein the side support member is tilted from vertical at a lean angle that is greater than or equal to 5 degrees and less than or equal to 20 degrees.

19. A tire assembly service cart comprising:
two tire assembly support structures, each tire assembly support structure comprising:
a side support member positioned to support a side of a tire assembly positioned on the tire assembly support structure and including a first side roller and a second side roller positioned above the first side roller and in line with the first side roller; and
at least two bottom support members positioned to support the tire assembly from the bottom, each of the at least two bottom support members having a bottom roller;
an upper member coupled to upper ends of the two tire assembly support structures; and a lower member coupled to lower ends of the two tire assembly support structures, wherein the first side roller, the second side roller and the bottom roller of each of the at least two bottom support members are positioned to allow the tire assembly to rotate around a rotation axis of the tire assembly support structure while supported by the tire assembly support structure.

20. The tire assembly service cart of claim 1, wherein the at least one tire assembly support structure further comprises one or more surfaces having at least one tool mounting point for mounting tools to the at least one tire assembly support structure.

\* \* \* \* \*